United States Patent [19]

Kuddes et al.

[11] Patent Number: 5,717,907
[45] Date of Patent: Feb. 10, 1998

[54] METHOD AND APPARATUS FOR GENERATING A RESET PULSE RESPONSIVE TO A THRESHOLD VOLTAGE AND TO A SYSTEM CLOCK

[75] Inventors: David W. Kuddes, Richardson; Scott Alan Green, Cedar Hill, both of Tex.

[73] Assignee: Alcatel Network Systems, Inc., Richardson, Tex.

[21] Appl. No.: 734,731

[22] Filed: Oct. 21, 1996

Related U.S. Application Data

[63] Continuation of Ser. No. 292,077, Aug. 17, 1994, abandoned.

[51] Int. Cl.⁶ .................................................. G06F 1/04
[52] U.S. Cl. ........................ 395/555; 395/559; 395/750
[58] Field of Search .................................. 395/750, 555, 395/559, 560

[56] References Cited

U.S. PATENT DOCUMENTS

| | | | |
|---|---|---|---|
| 4,464,584 | 8/1984 | Hentzachel et al. | 307/200 |
| 4,551,841 | 11/1985 | Fujita et al. | 371/66 |
| 4,788,661 | 11/1988 | Morita | 364/900 |
| 5,019,996 | 5/1991 | Lee | 364/483 |
| 5,454,114 | 9/1995 | Yach et al. | 395/750 |

OTHER PUBLICATIONS

Joseph D. Greenfield, "Practical Digital Design Using Ics", 1983, pp. 165-168 and 186-188.

*Primary Examiner*—Dennis M. Butler
*Attorney, Agent, or Firm*—Vinson & Elkins L.L.P.

[57] ABSTRACT

A reset pulse generating circuit is disclosed for generating reset pulses that are used for placing digital systems such as microprocessors into a known state upon power-up and when power fluctuations occur. The reset pulse generating circuit includes a memory circuitry and a counter circuitry, and is designed to work in conjunction with a threshold detector circuitry that monitors the level of the power supply voltage and provides a binary output indicating whether the power supply voltage is above or below a threshold value. The memory circuitry includes four series-connected D-type flip flops, the first two of which are resetable in response to fluctuations in the supply voltage and asynchronous to the system clock. The asynchronous reset inputs of the latter flip flops are for coupling to the output of the threshold detector circuitry. The output of the memory circuitry is used to control the counter circuitry. In turn, the counter circuitry provides the reset pulse.

27 Claims, 4 Drawing Sheets

METHOD AND APPARATUS FOR GENERATING A RESET PULSE RESPONSIVE TO A THRESHOLD VOLTAGE AND TO A SYSTEM CLOCK

RELATED APPLICATIONS

This application is a continuation of application Ser. No. 08/292,077, filed Aug. 17, 1994, and entitled, "METHOD AND APPARATUS FOR GENERATING A RESET PULSE RESPONSIVE TO A THRESHOLD VOLTAGE AND TO A SYSTEM CLOCK," now abandoned.

This invention relates to reset pulse generating circuits used for placing digital systems such as microprocessors into a known state upon power-up and when power fluctuations occur. More particularly, the invention relates to reset pulse generating circuits that are responsive to the system clock as well as the power supply voltage.

BACKGROUND OF THE INVENTION

Low power supply voltage can cause many types of digital systems to function erratically. Also, many digital systems assume a random state upon power-up and will therefore function erratically even under normal power supply conditions until the system is placed into a known state. For this reason, such systems are usually equipped with a reset feature by means of which the system can be made to assume a known state responsive to a reset pulse.

For example, many microprocessors include a reset pin for sensing such a reset pulse. A reset pulse generating circuit is usually located somewhere on the microprocessor motherboard, its output being coupled to the microprocessor's reset pin. When power to the motherboard is initially turned on and the power supply voltage begins to climb, the reset pulse generating circuit asserts the reset signal. Ideally, when the reset circuit senses that the power supply voltage has stabilized at an acceptable operating level, it will deassert the reset signal. The microprocessor is programmed to assume a known state responsive to the assertion and deassertion of the reset signal, which assertion and deassertion constitute the reset pulse. After the reset pulse is no longer present on the reset pin, the microprocessor begins normal operation starting from the known reset state. Typically, the reset circuit continues to monitor the power supply voltage thereafter and provides further reset pulses whenever it senses the power supply voltage has dipped below the minimum acceptable operating level.

Several problems are inherent in the design of reset pulse generating circuits. One problem involves the difficulty of generating a reset pulse that has the correct pulse width or duration. If the duration of the reset pulse is too long, then valuable processor time can be wasted under conditions in which resets happen frequently, such as during periods of frequent power interruptions or brown-outs. On the other hand, if the reset pulse is too short, then the pulse may fail of its essential purpose because most microprocessors require the reset pulse to be present at the reset pin for a minimum number of system clock cycles. A related design problem in such circuits is that the minimum duration of the reset pulse provided must be fairly repeatable. To address these problems of repeatability and pulse width, designers have used RC time constants to control the length and shape of the reset pulse. For example, U.S. Pat. Nos. 4,300,065, 4,434,403 and 4,520,418 all disclose the use of an RC time constant in relation to generating a reset pulse of a specific duration. For the same purpose, designers have also used various techniques involving the charging and discharging of capacitors. For example, U.S. Pat. Nos. 4,797,584, 4,296,338, 4,553,054 and 5,109,163 all disclose the use of capacitor charging and/or discharging in relation to generating a reset pulse of a specific duration and/or shape. Both of these classes of designs suffer from the drawback that resistor and capacitor values differ from component to component. Therefore, in order to achieve a precise and repeatable pulse duration, the designer must specify components that have precise tolerances. Such components are expensive and difficult to manufacture.

Another problem inherent in the design of reset pulse generating circuits is that the rise in power supply voltage from its off state to its stable operating level is frequently noisy. Thus, during a single rise in the power supply voltage from zero volts to the steady state operating condition, the power supply voltage may cross the minimum microprocessor operating threshold several times. Such multiple threshold crossings can cause multiple reset pulses to be generated, thus resetting the microprocessor repeatedly where a single reset would be more desirable. To address this problem, designers have made use of analog hysteresis. Specifically, the reset circuit is designed to have different trip points depending on whether the power supply voltage is going from a low to a high voltage or vice versa. The area between the low-to-high trip point and the high-to-low trip point on the power supply voltage curve constitutes the hysteresis zone. The purpose of the zone is to provide resistance to noise in the power supply voltage as it passes through the zone. For example, U.S. Pat. Nos. 4,296,338 and 4,553,054 disclose the use of a Schmitt trigger to implement analog hysteresis in relation to generating a reset pulse. Once again, however, such designs are dependent upon precise component values because the trip points of the Schmitt trigger are determined by resistor, capacitor and transistor characteristics. For example, U.S. Pat. No. 4,764,839 teaches reliance on precise component values to achieve the trip points needed for analog hysteresis. Moreover, analog hysteresis sometimes requires the addition of discrete components external to an integrated circuit chip that might otherwise have housed the entire reset circuit.

Another problem inherent in the design of reset pulse generating circuits is that some circuit boards are purposely designed so that different areas of the board receive power at different times as the board is plugged into an active socket. Such board designs are common in the field of digital telecommunications, where circuit boards frequently must be removed and inserted in active circuit board racks without powering down the other boards in the rack. The purpose of staggering the application of power to the new boards as they are inserted into the rack is to make the current surge in the rack less sudden, thus protecting the other boards in the rack from significant dips in the power supply. The difficulty is that, when different areas of a board power up at different times, the reset pulse generating circuit on the board may receive power before the system clock, or vice versa. Under such circumstances it would be possible for a conventional reset circuit to provide the power-on reset pulse before the microprocessor on the board is ready to sample the pulse. Thus, the pulse would fail to reset the microprocessor.

By way of further background, U.S. Pat. No. 5,111,067 discloses a power-up reset circuit including a "latching circuit." Note that the "latching circuit" is not a memory or storage device.

By way of still further background, U.S. Pat. No. 5,109,506 discloses a microcomputer system including a microprocessor reset circuit. The patent discloses a complex method of using a counter to determine the pulse width of a "newreset" pulse in a system utilizing two different system clocks that must operate in a specific phase relationship with one another.

It is therefore an object of the present invention to provide a reset pulse generating circuit capable of generating a reset pulse with a variable total duration but with a minimum duration that is controllable and repeatable.

It is another object of the present invention to provide a reset pulse generating circuit that achieves the above without reliance on precise component tolerances.

It is another object of the present invention to provide a reset pulse generating circuit that may be implemented inside an integrated circuit package without the need for external components.

It is another object of the present invention to provide a reset pulse generating circuit that is responsive not only to the level of the power supply voltage, but also to the system clock.

It is another object of the present invention to provide a reset pulse generating circuit that avoids producing multiple reset pulses when there is noise in the rise characteristic of the power supply voltage, and to do so without the use of analog hysteresis.

It is another object of the present invention to provide a reset pulse generating circuit that will not deassert the reset signal until the system clock has been valid for the minimum number of cycles required to reset a microprocessor effectively, even if the reset circuit receives power before the clock oscillator during powerup.

It is another object of the present invention to provide a reset pulse generating circuit that will achieve one or more of the above objectives in a simple, economical way.

Other objects of the present invention will be appreciated by those having ordinary skill in the art and having reference to this specification including the drawings and claims.

SUMMARY OF THE INVENTION

In the preferred embodiment, the present invention includes a method and apparatus for generating a reset pulse for placing digital systems such as microprocessors into a known state upon power-up and when power fluctuations occur. The apparatus of the invention is a reset pulse generating circuit that includes a memory circuitry and a counter circuitry. The reset circuit of the invention is designed to operate in conjunction with a threshold detector circuitry that senses the level of the power supply voltage and provides a binary output indicating whether the power supply voltage is above or below a threshold value. The memory circuitry includes a one-bit memory or storage element whose contents may be altered responsive to the output of the threshold detector circuitry without regard to the presence of the system clock. The memory or storage element may also be altered responsive to the system clock. In this manner, the memory circuitry is able to (1) store a record of an instance in which the power supply voltage was below the threshold value, even if the system clock was not present when the instance occurred, and (2) erase the record once the power supply and the system clock have both become stable. Before the record is erased, however, the memory circuitry uses the stored record to control the counter circuitry for producing a reset pulse. The minimum duration of the reset pulse is determined by counting a predetermined number of system clock pulses. The reset signal so produced is responsive to an output of the counter circuitry.

BRIEF DESCRIPTION OF THE DRAWINGS

For a more complete understanding of the present invention, and the advantages thereof, reference is now made to the following descriptions taken in conjunction with the accompanying drawings, in which:

FIG. 4b illustrates how the THRESH signal of the preferred embodiment operates in response to the power interruption shown in FIG. 4a;

FIG. 4c is a timing diagram illustrating various timing relationships occurring in the preferred embodiment of the invention in response to a power interruption like that shown in FIG. 4a;

FIG. 5b illustrates how the THRESH signal of the preferred embodiment operates in response to the power-up conditions shown in FIG. 5a;

FIG. 5c is a timing diagram illustrating various timing relationships occurring in the preferred embodiment of the invention in response to power-up conditions like those shown in FIG. 5a;

FIG. 6b is a timing diagram illustrating various timing relationships occurring in the preferred embodiment of the invention in response to conditions like those shown in FIG. 6a.

DETAILED DESCRIPTION OF THE PREFERRED EMBODIMENTS

The construction and operation of the preferred embodiments of the invention will now be described with reference to the drawings. Throughout this specification, the term "asynchronous" means without regard to the presence or phase of the system clock signal. The terms "clock," "clock signal" and "system clock signal" are synonymous herein. They refer to the clock signal that drives the microprocessor or other digital system intended to be reset by the reset pulse. The term "memory" is used herein to describe devices that are capable of receiving information responsive to an input condition and storing the information for later retrieval even after the input condition has been removed. Thus, "memory" devices in this specification are to be distinguished from other binary circuits whose outputs, though bistable, are continuously dependent on their inputs.

Figure 1:
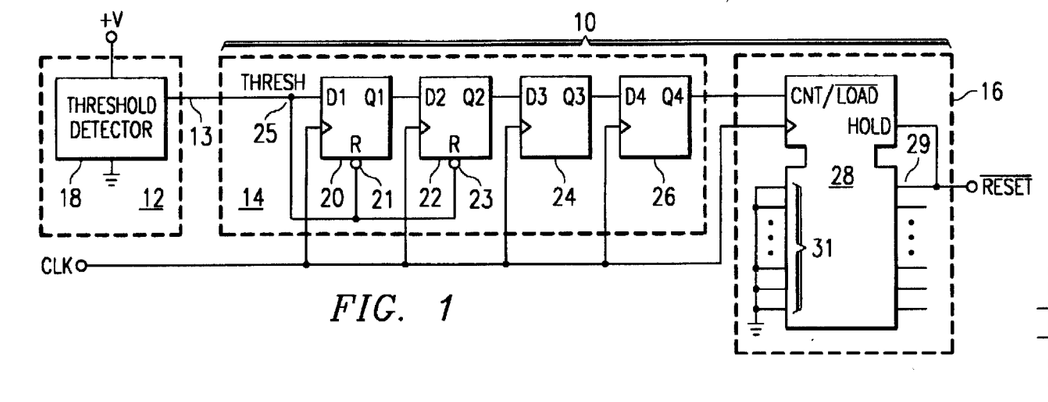
FIG. 1 illustrates a preferred embodiment of the invention in schematic form.

FIG. 1 illustrates a preferred embodiment of the invention in schematic form. Reset pulse generating circuit 10 is connected to a threshold detector circuitry 12. Reset pulse generating circuit 10 includes a memory circuitry 14 and a counter circuitry 16. Counter circuitry 16 provides the reset pulse via the output signal RESET. The power supply voltage is indicated in the drawing as V+. The system clock signal is indicated as CLK.

Threshold detector circuitry 12 preferably includes a threshold detector 18. Preferably, threshold detector 18 is a 33064 voltage threshold monitor. The circuit of the invention may be implemented, however, using any suitable threshold detector. Such a threshold detector should continuously monitor the level of the power supply voltage V+ relative to a reference voltage, such as ground, instantaneously indicating with a binary output 13 whether the power supply voltage V+ is above or below a predetermined and fixed threshold value. The threshold value should be chosen to correspond to the minimum operating voltage of the digital system for which the reset pulse generating circuit will be used. Threshold detector circuitry 12 may include analog hysteresis, but such hysteresis is not necessary to implement the circuit according to the preferred embodiment. In the drawings, output 13 of threshold detector 18 is labeled THRESH.

Memory circuitry 14 includes four series-connected D-type flip flops 20, 22, 24 and 26. Each of flip flops 20, 22, 24 and 26 constitutes a one-bit memory. The first two flip flops 20 and 22 are asynchronously resetable. Particularly, flip flops 20 and 22 have asynchronous reset inputs 21 and 23, respectively, by which they may be reset without regard to the clock signal CLK. Asynchronous reset inputs 21 and 23 are asserted low and are labeled R in the drawings. Asynchronous reset inputs 21 and 23 are coupled together at node 25. Node 25 is coupled to output 13 of threshold detector 18. The clock inputs of flip flops 20, 22, 24 and 26 are all coupled together and connected to system clock signal CLK.

Figure 2:
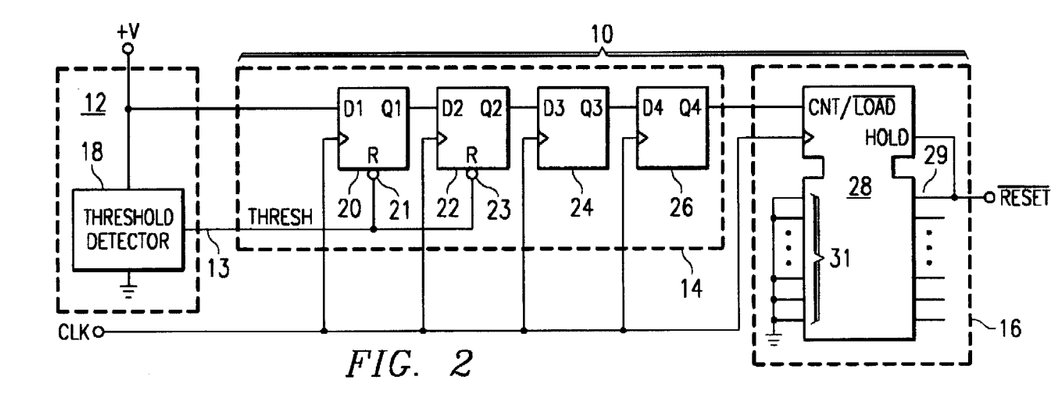
FIG. 2 illustrates an alternative embodiment of the invention in schematic form.

Each of flip flops 20, 22, 24 and 26 functions to store whatever information is present at its D input when a rising edge of CLK is detected at is clock input. The noninverting output of each flip flop reflects the contents of the information stored therein. The noninverting outputs of flip flops 20, 22, 24 and 26 are labeled Q1, Q2, Q3 and Q4, respectively. The D inputs of flip flops 20, 22, 24 and 26 are labeled D1, D2, D3 and D4, respectively. In the embodiment of FIG. 1, the D input of flip flop 20 is connected to output 13 of threshold detector 18 at node 25. Thus, in the embodiment of FIG. 1, output 13 acts as the data source for flip flop 20. FIG. 2, however, illustrates an alternative embodiment wherein the D input of flip flop 20 is connected to power supply voltage V+. Thus, in the alternative embodiment of FIG. 2, a fixed voltage acts as the data source for flip flop 20. As detailed below, both the FIG. 1 and FIG. 2 embodiments operate in a similar manner whereby the data source (either V+ or THRESH) is recorded and transferred by the flip flops of memory circuitry 14.

The D input of flip flop 22 is connected to the noninverting output of flip flop 20. The D input of flip flop 24 is connected to the noninverting output of flip flop 22. The D input of flip flop 26 is connected to the noninverting output of flip flop 24.

Figure 3:
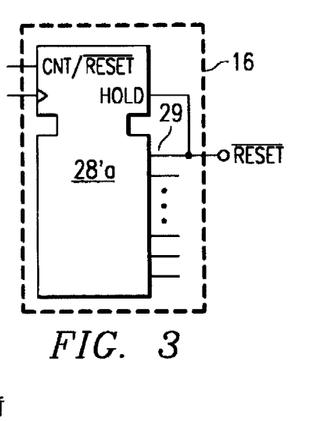
FIG. 3 illustrates an alternative embodiment of the counter circuitry of the invention.

Counter circuitry 16 preferably includes a counter 28. In the embodiment of FIG. 1, counter 28 has a clock input and a control input CNT/LOAD. The CNT/LOAD input functions so that counter 28 will increment its count each time a rising edge of CLK is detected at the clock input of counter 28 while a logic high is present at the CNT/LOAD input. If, however, a rising edge of CLK is detected while a logic low is present at the CNT/LOAD input, then counter 28 loads its count to whatever value is present on load inputs 31. In the preferred embodiment, load inputs 31 are connected to ground so that the load value will always be zero. However, load inputs 31 may be connected to different potentials so that any desirable value is loaded. In this manner, a variety of minimum pulse widths may be chosen for the reset pulse. In the alternative embodiment of FIG. 3, counter 28a has a control input CNT/RESET instead of CNT/LOAD. The only difference between counter 28 and counter 28a is that counter 28a will always reset its count to zero (as opposed to an input load value) whenever a rising edge of CLK is detected while a logic low is present at the CNT/RESET input. Both counters 28 and 28a have a control input HOLD. The HOLD input functions to suspend counting as long as the input is asserted. When the HOLD input is deasserted, counting may resume without a reset or a load operation. In the preferred embodiments, the HOLD input is connected to the RESET signal.

Figure 4A:
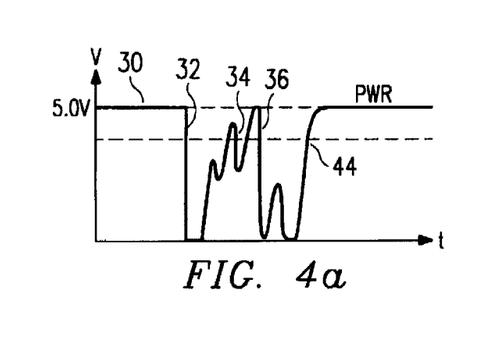
FIG. 4a illustrates a short, noisy interruption of the power supply voltage.
Figure 4B:
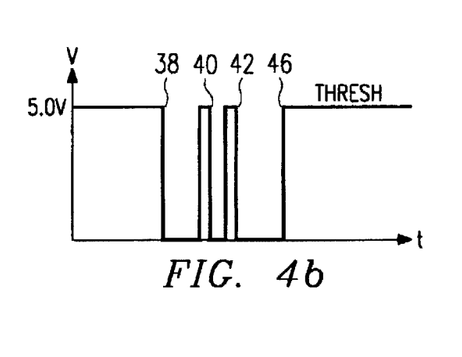

The operation of the preferred embodiments will now be described with particular reference to the remaining drawings. FIG. 4a illustrates a short, noisy interruption of the power supply voltage, and FIG. 4b illustrates how the THRESH signal of the preferred embodiment operates in response to the power interruption shown in FIG. 4a. In the steady state condition, V+ is at its maximum level 30 and THRESH is asserted high. When a power interruption occurs, i.e. when V+ dips below a predetermined threshold voltage as at 32, 34 and 36, THRESH is deasserted at 38, 40 and 42. When V+ returns to its normal operating level 44, THRESH is once again asserted at 46.

Figure 4C:
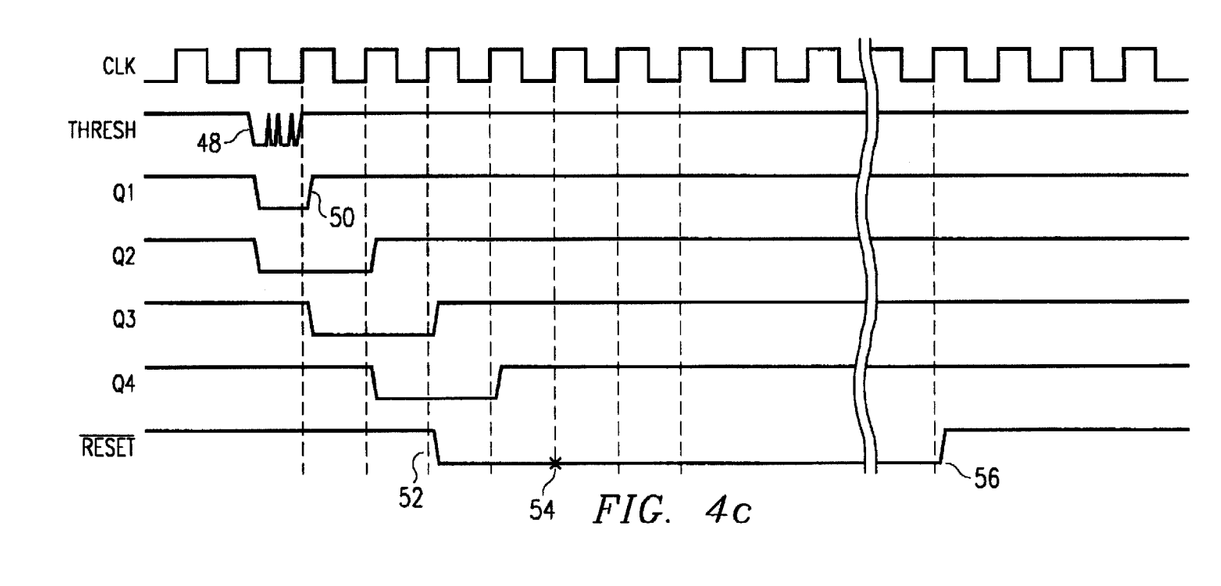

FIG. 4c is a timing diagram illustrating various timing relationships occurring in the preferred embodiment of the invention in response to a power interruption like that shown in FIG. 4a. In the steady state condition of reset circuit 10, CLK is oscillating at a sufficient magnitude to be considered valid, and THRESH is high because V+ is steadily maintained above the operating threshold voltage level. Q1–Q4 are all high in the steady state because active-low asynchronous reset inputs 21 and 23 are not asserted, and because the input to flip flop 20 is high and is propagated through to the output of flip flop 26 by CLK. Because Q4 is high, counter 28 counts clock pulses in the steady state until counter most significant bit 29 is asserted, at which time counter 28 holds its count and RESET remains unasserted. Note that any output bit of counter 28 may be used to provide the reset signal without altering the basic function of the invention.

Assume now that V+ is interrupted by noise. The result is a series of deassertions of THRESH such as those shown in FIG. 4c at 48. In response to the first deassertion of THRESH, both Q1 and Q2 are deasserted immediately and simultaneously because THRESH is connected to the active-low asynchronous reset inputs 21 and 23 of flip flops 20 and 22. When both the R and D inputs to flip flop 20 return high (i.e., when THRESH returns high) and CLK presents a rising edge to the clock input of flip flop 20, Q1 will return high as at 50. Assuming that THRESH remains high, and therefore flip flops 20 and 22 are not reset again, Q2 will go high one CLK after Q1 went high because the D input of flip flop 22 is connected to Q1. Q3 always follows one CLK behind the state of Q2 because the D input of flip flop 24 is connected to Q2. For the same reason, Q4 always follows one CLK behind the state of Q3. The result is that Q4 eventually presents counter 28 with a load command that will be a minimum of two CLKs long. This two-clock width ensures that counter 28 will see the load command on a rising edge of CLK. The load command causes the active-low output signal RESET to be asserted, as at 52, because counter 28 is loaded with zero. Counter 28 will begin counting on the first rising edge of CLK after Q4 is deasserted, as at 54. It will keep RESET asserted until the count is high enough for the most significant bit of counter 28 to be asserted, at which time RESET is unasserted and counter 28 holds its count, as at 56. The overall result is one single assertion of RESET between 52 and 56 in response to a noisy V+ interruption at 48, said RESET assertion being of definite duration between 54 and 56.

Figure 5A:
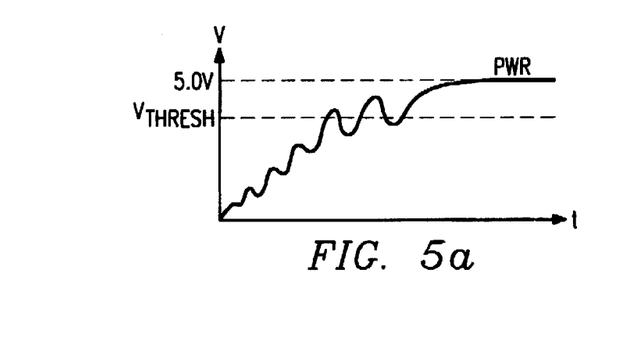
FIG. 5a illustrates a typical noisy rise in power supply voltage from its off state to its steady operating state.
Figure 5B:
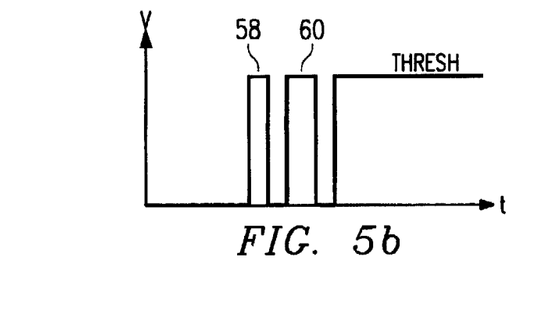
Figure 5C:
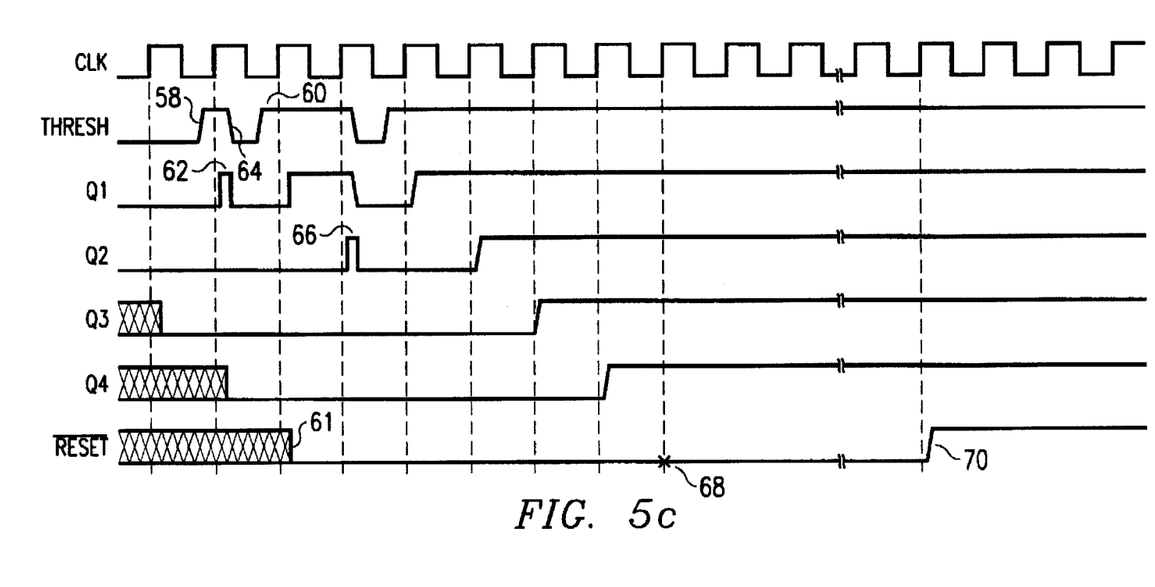

FIGS. 5a–c illustrate the operation of reset circuit 10 on initial power-up assuming CLK becomes stable before V+. FIG. 5a shows a typical waveform for the V+ signal as it climbs from its off state to its steady operational state. Because this rise in V+ may be noisy, THRESH may be asserted and deasserted more than once, as at 58 and 60, before V+ is stable. This causes the timing patterns shown in FIG. 5c. Q1 and Q2 are initially reset low because the R inputs of flip flops 20 and 22 are connected to THRESH, which is initially low. Whatever the initial state of Q3 and Q4, Q4 will be low within two rising edges of CLK because the initial low at Q2 will then have been propagated to Q4 within this time. This low at Q4 in turn will load counter 28 with a zero by the third rising edge of CLK, as is indicated by the state of RESET at 61. Whenever THRESH stays high during a rising edge of CLK, the output of Q1 will go high, as at 62, at least until THRESH goes low again as at 64. Q2 will go high whenever Q1 is high during a rising edge of CLK, as at 66. Finally, whenever Q1 settles into its high state, as at 68, outputs Q2–Q4 each will follow one CLK behind the other, propagating this high signal to the CNT/LOAD input of counter 28 thus enabling counter 28 to count clock pulses. Counter 28 will begin counting on the first CLK after it is enabled as at 68. When the count has incremented far enough for the most significant bit of counter 28 to be asserted, RESET goes high, as at 70, and the counter holds. The result, once again, is one single assertion of RESET having a definite duration despite the noisy character of the V+ signal as it climbs to its steady-state condition.

Figure 6A:
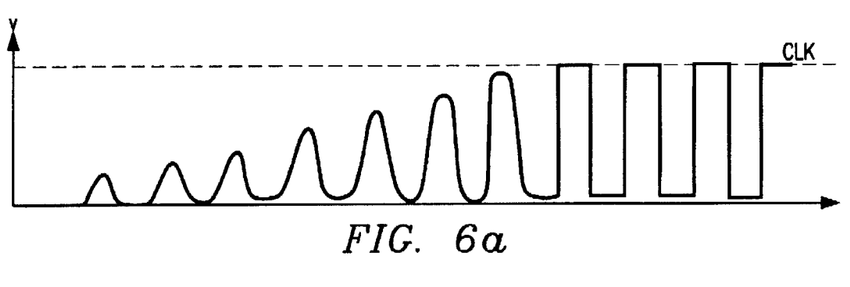
FIG. 6a illustrates a typical rise in the system clock from its off state to its steady operating state.
Figure 6B:
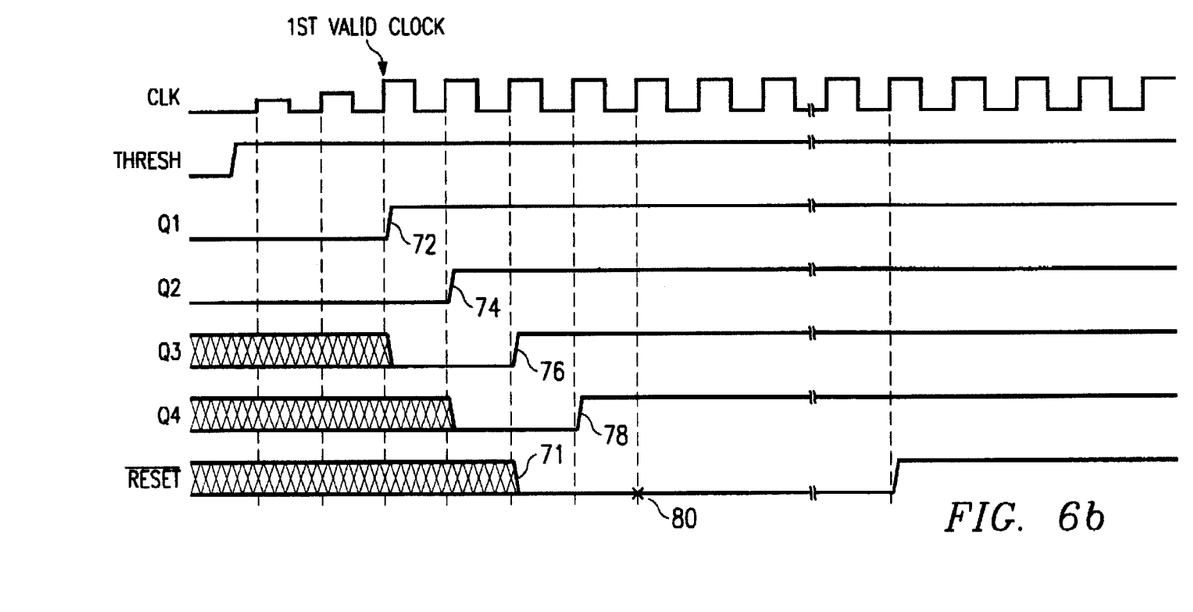

FIGS. 6a–b illustrate the operation of reset circuit 10 on initial power-up assuming V+ becomes stable before CLK. Particularly, FIG. 6a illustrates a typical rise in the system clock from its off state to its steady operating state, and FIG. 6b illustrates various timing relationships occurring in response to conditions like those shown in FIG. 6a. Because THRESH is initially low, Q1 and Q2 will be low initially. Then, THRESH will go high as V+ becomes stable, but Q1 and Q2 will remain low because no CLK rising edges are present yet to propagate this high signal through flip flops 20–26. Q3 will go low on the first rising edge of CLK, and Q4 will follow one CLK later, thus presenting a load signal to counter 28. When counter 28 loads, RESET is asserted at 71. Beginning on the first valid CLK, flip flops 20–26 will begin propagating the high THRESH signal so that Q1–Q4 each will go high at 72–78 respectively. When Q4 goes high, counter 28 is enabled and begins counting at 80. Finally, when the count has incremented far enough for the most significant bit of counter 28 to be asserted, RESET is deasserted and counter 28 holds. The result is one single assertion of RESET having a definite duration.

Finally, note that the number of flip flops used in the preferred embodiments ensure that set-up and hold times will be met in every case and that metastability problems will be avoided. However, a different number of flip flops as well as different types of flip flops might be used to practice the invention. Also, different counter types might be used to practice the invention where it is necessary or beneficial to do so.

One significant advantage achieved by the method and apparatus of the invention is that the reset pulse is of variable duration, but its minimum duration can be fixed to be equal to or greater than the minimum number of clock cycles required to reset a particular microprocessor.

Another advantage of the present invention is that the reset signal is never deasserted until both CLK and V+ are valid, in addition to the CLK signal having been present for the minimum required number of cycles. This is especially important in telecommunications applications of the kind mentioned above, in which circuit boards are intentionally designed so that some circuits receive power before others.

Another advantage of the present invention is that the minimum duration of the reset pulse is set by the counter circuitry. Thus, the minimum duration is precisely controllable and repeatable and does not depend on the tolerances of individual resistors, capacitors or other like components.

Another advantage of the present invention is that resistance to noise in the rising power supply voltage characteristic is achieved without the use of analog hysteresis and its associated problems.

Another advantage of the present invention is that, because the entire circuit can be implemented using only four flip flops and a counter, all of the above advantages are achieved in a simple and economical way. Moreover, all of these components may be integrated into a single package without the use of external components.

Other benefits and advantages of the present invention will be apparent to those having ordinary skill in the art.

Although this detailed description has been directed to exemplary embodiments of the invention, it will also suggest various modifications and alternative embodiments to those having ordinary skill in the art. For example, the invention encompasses all modifications and alternative embodiments that fall within the scope of the following claims.

What is claimed is:

1. A circuit for generating a reset pulse, said circuit operable with a pulsing clock signal, a power supply voltage and a threshold detector circuitry for outputting a threshold signal indicating the level of the power supply voltage, said circuit comprising:
   a memory circuitry comprising:
      a one-bit memory for storing a state;
      a first input for receiving the threshold signal such that said state of said one-bit memory may be altered responsive to the voltage level of the power supply voltage and without regard to the clock signal;
      a second input for receiving the clock signal such that said state of said one-bit memory may be altered responsive to the clock signal; and
      a memory circuitry output;
   a counter circuitry for counting pulses of the clock signal, said counter circuitry comprising;
      a control input coupled to said memory circuitry output;
      a clock input for receiving the clock signal; and
      a signal output for generating the reset pulse, said signal output responsive to the count of clock signal pulses stored in said counter circuitry.

2. The circuit of claim 1, wherein said memory circuitry comprises a flip flop.

3. The circuit of claim 2, wherein said flip flop comprises a D-type flip flop, and wherein said first input comprises an asynchronous reset input of said D-type flip flop such that said D-type flip flop may be reset without regard to the clock signal, and wherein the D input of said flip flop is coupled to receive a data source.

4. The circuit of claim 3, wherein said data source comprises the threshold signal.

5. The circuit of claim 3, wherein said data source comprises the power supply voltage.

6. The circuit of claim 1, wherein said one-bit memory comprises a first flip flop and wherein the memory circuitry further comprises a second flip flop.

7. The circuit of claim 6, wherein each of said first and second flip flops comprises a D-type flip flop having an asynchronous reset input such that each of said first and second flip flops may be reset without regard to the clock signal.

8. The circuit of claim 7, wherein said asynchronous reset input of said first and second flip flops are connected at a node, said node comprising said first input.

9. The circuit of claim 8, wherein the D input of said second flip flop is coupled to an output of said first flip flop, and the D input of said first flip flop is for coupling to a data source.

10. The circuit of claim 9, wherein said data source comprises the threshold signal.

11. The circuit of claim 9, wherein said data source comprises the power supply voltage.

12. The circuit of claim 1, wherein said memory circuitry comprises a first, a second, a third and a fourth D-type flip flop, said first and second flip flops each having an asynchronous reset input such that said first and second flip flops may be reset without regard to the clock signal, said first and second flip flops having said asynchronous reset inputs coupled to a node comprising said first input, the D input of said first flip flop for coupling to a data source, the D input of said second flip flop coupled to an output of said first flip flop, the D input of said third flip flop coupled to an output of said second flip flop, the D input of said fourth flip flop coupled to an output of said third flip flop, and wherein an output of said fourth flip flop comprises said memory circuitry output.

13. The circuit of claim 12, wherein said data source comprises the threshold signal.

14. The circuit of claim 12, wherein said data source comprises the power supply voltage.

15. The circuit of claim 1, wherein said control input of said counter circuitry comprises a count/load input, wherein said counter circuitry may be enabled to count clock pulses when said count/load input is presented with one binary value and wherein said counter circuitry will load a data value responsive to the clock signal when said count/load input is presented with the opposite binary value.

16. The circuit of claim 1, wherein said control input of said counter circuitry comprises a count/reset input, wherein said counter circuitry may be enabled to count clock pulses when said count/reset input is presented with one binary value and wherein said counter circuitry will reset to an initial value responsive to the clock signal when said count/reset input is presented with the opposite binary value.

17. The circuit of claim 1, wherein said counter circuitry comprises a hold input whereby said counter circuitry holds its count when said hold input is asserted and resumes counting when said hold input is deasserted, and wherein said hold input is coupled to said signal output.

18. The circuit of claim 1, wherein an output of said counter circuitry comprises said signal output.

19. A method of generating a reset pulse for a system operable with a clock signal and a power supply voltage, comprising the steps of:

storing, without regard to the clock signal and in a memory circuit, a record of an instance in which the level of the power supply voltage was less than a threshold value;

erasing, synchronously with the clock signal, the record from the memory circuit when the power supply voltage is above the threshold value and the clock signal is present;

deriving a control signal responsive to the contents of the memory circuit; and producing the reset pulse responsive to the control signal.

20. The method of claim 19 and further comprising the step of applying the control signal to a counter circuitry operable to count clock pulses, and wherein said step of producing the reset pulse comprises producing the reset pulse from an output of the counter circuitry.

21. The method of claim 19 wherein the memory circuit comprises a D-type flip flop, and wherein said erasing step comprises:

applying a data source to a D input of the D-type flip flop; and applying the clock signal to a clock input of the D-type flip flop.

22. The method of claim 21, wherein said step of applying a data source comprises applying a threshold signal, the threshold signal responsive to the level of the power supply voltage.

23. The method of claim 21, wherein said step of applying a data source comprises applying the power supply voltage.

24. The method of claim 19, wherein said storing step comprises storing the record in a D-type flip flop having an asynchronous reset input, wherein said flip flop is reset without regard to the clock signal, said asynchronous reset input being driven by a threshold signal responsive to the level of the power supply voltage.

25. The method of claim 19 wherein said storing step comprises storing a record in a first flip flop, and further comprising the steps of:

transferring the record from the first flip flop to a second flip flop in response to the clock signal;

transferring the record from the second flip flop to a third flip flop in response to the clock signal; and transferring the record from the third flip flop to a fourth flip flop in response to the clock signal.

26. The method of claim 25 wherein said deriving step comprises outputting a signal from the fourth flip flop.

27. The method of claim 19 wherein said producing step comprises the steps of:

asserting the reset pulse upon receiving the control signal in a first state;

counting pulses of the clock signal while continuously asserting the reset pulse after receiving the control signal in a second state; and deasserting the reset pulse upon counting a predetermined number of pulses of the clock signal.

* * * * *

UNITED STATES PATENT AND TRADEMARK OFFICE
CERTIFICATE OF CORRECTION

PATENT NO. : 5,717,907

DATED : February 10, 1998

INVENTOR(S) : David W. Kuddes, Alan Green

It is certified that error appears in the above-identified patent and that said Letters Patent is hereby corrected as shown below:

Col. 3, ln. 31, delete "during powerup", insert -- during power-up --.

Col. 4, ln. 62, delete "output signal RESET", insert -- output signal RESET --.

Col. 5, ln. 30, delete "at is clock", insert -- at its clock --.

Col. 8, ln. 41, delete "the dock signal", insert -- the clock signal --.

Col. 8, ln. 46, delete "circuitry comprising;", insert -- circuitry comprising: --.

Signed and Sealed this

Fourteenth Day of April, 1998

Attest:

BRUCE LEHMAN

Attesting Officer

Commissioner of Patents and Trademarks